2,686,648

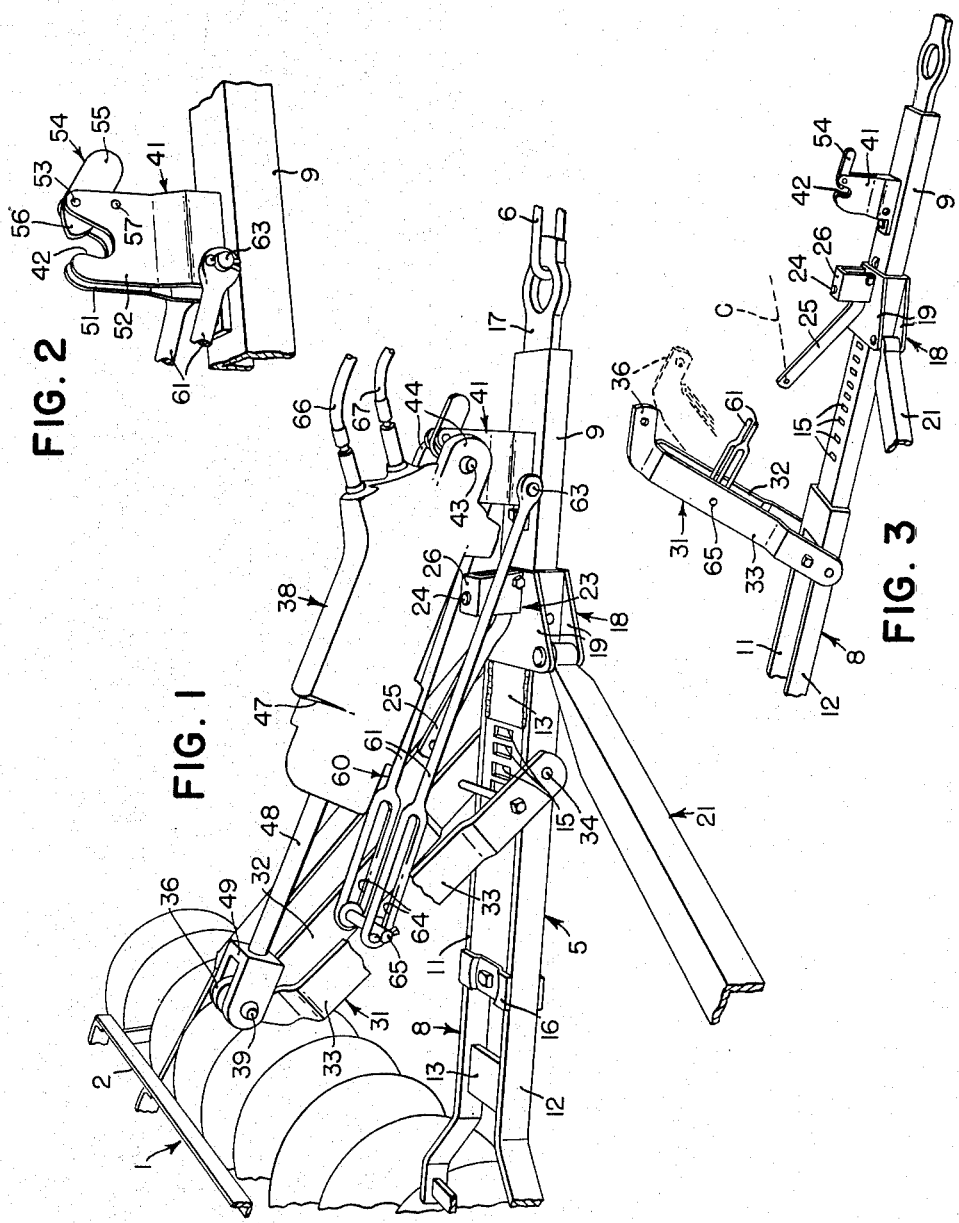
Aug. 17, 1954     W. P. OEHLER     2,686,648
BRACKET AND ARTICLE ATTACHING MEANS
Original Filed April 28, 1945
*INVENTOR.*
WILLIAM P. OEHLER
ATTORNEYS Patented Aug. 17, 1954

UNITED STATES PATENT OFFICE 2,686,648

BRACKET AND ARTICLE ATTACHING MEANS

William P. Oehler, Moline, Ill., assignor to Deere & Company, Moline, Ill., a corporation of Illinois Original application April 28, 1945, Serial No. 590,831. Divided and this application December 29, 1948, Serial No. 68,007

1 Claim. (Cl. 248—309)

This application is a division of my co-pending application, Serial No. 590,831, filed April 28, 1945, for Disk Harrow, now U. S. Patent 2,579,086, issued December 18, 1951.

The present invention relates generally to agricultural implements and more particularly to disk harrows and the like that are adapted to be drawn by a tractor and controlled by a power unit deriving power from the tractor but which may also be controlled manually in the event a power unit is not available.

The object and general nature of the present invention is the provision of a disk harrow having new and improved means for receiving the hydraulic piston and cylinder unit of a hydraulic power lift which normally forms a permanent part of the tractor, the mounting mechanism being arranged to accommodate a quick and easy connection of the hydraulic unit to the implement and a quick and easy disconnection of the hydraulic unit from the implement, thereby facilitating hitching and unhitching the implement to and from the tractor.

More particularly, it is a feature of this invention to provide a cylinder-receiving bracket having novel detent means which, while readily releasable, effectively secures the cylinder to the bracket but which may readily be operated to release the cylinder whenever desired.

These and other objects and advantages of the present invention will be apparent to those skilled in the art after a consideration of the following detailed description, taken in conjunction with the accompanying drawings in which the preferred form of the invention has been illustrated.

In the drawings:

Figure 1 is a perspective view of a disk harrow in which the principles of the present invention have been incorporated.

Figure 2 is a fragmentary perspective showing the cylinder-receiving bracket structure which detachably receives the hydraulic piston and cylinder unit.

Figure 3 is a view similar to Figure 1 but showing the parts in the positions they occupy when the hydraulic cylinder is removed and the disk harrow controlled manually.

Referring now to the drawings, the disk harrow which has been chosen to illustrate the principles of the present invention incorporates a pair of disk gangs 1, each having a scraper frame 2, the gangs being connected together at their inner ends for swinging in a generally horizontal plane into and out of straightened and angled positions. It will be understood that when the gangs 1 are in their straightened position they are arranged for transport and that when they are in an angled position they are arranged for operation. The disk harrow is adapted to be propelled by any suitable propelling means, preferably a tractor (not shown) to which the drawbar structure 5 of the disk harrow is connected, as by a clevis 6 or other suitable means.

The drawbar means of the disk harrow comprises a pair of relatively slidable or telescopically associated members 8 and 9, the former being connected at its rear end to the inner ends of said gangs 1 and preferably taking the form of a pair of angle members 11 and 12 connected together by any suitable means, such as spacers 13, in laterally spaced apart relation. The front spacer 13 serves as a stop and will be referred to below in detail, for the rear end of the other drawbar member 9, which preferably is in the form of a channel having a plurality of apertures 15 therein and a stop plate 16 bolted to the rear end of the channel 9. The forward end of the channel receives a hitch bar 17 which is apertured to receive the clevis 6. A slide member 18 is mounted on the drawbar channel 9 and is provided with lateral ears 19 which are apertured to receive pins by which the forward ends of a pair of draft links 21 are pivotally connected to the slide member 18. The draft links 21 are connected at their rear ends to the ends of the disk gangs 1. The slide 18 carries a latch structure 23 thereon, which includes a plunger 24 and a spring biased trip lever 25 mounted in a support 26 fixed to the upper plate of the slide 18. The outer end of the trip arm 25 is apertured to receive a cable or operating rope which, when pulled forwardly, serves to raise the plunger 24 out of engagement with one of the openings 15 in the drawbar channel 9.

For receiving the cylinder of a hydraulic unit, I provide a swinging or pivoted arm 31, preferably made up of a pair of bars 32 and 33 which at their lower ends are pivoted, as at 34, to the front portion of the rear drawbar member 18. The arm or lever 31 extends generally upwardly, and at their upper ends the bars 32 and 33 are brought together to form an apertured lug 35 to which one end of the hydraulic piston and cylinder unit 38 may be connected in any suitable way, as by a quick detachable pin 39.

Mounted on the forward end of the drawbar channel 9 is a bracket 41 that is made up of a plate bent into U-shape and notched, as at 42, to receive a pin 43, which may be like the pin 39 mentioned above, carried in a pair of apertured lugs 44 forming a part of the cylinder unit 38. The latter preferably comprises a cylinder proper, as shown at 47, and a piston rod 48 which at its rear end terminates in a yoke 49 apertured to receive the quick detachable pin 39. The two sides 51 and 52 of the brackets 41 are formed so as to provide the notch mentioned above, and the two side portions are apertured to receive a pin 53 on which a detent 54 is swingably mounted. The detent is of the weighted or over-balance type, including the weighted end 55 and a cylinder-locking nose section 56. A pair of apertures are formed in the bracket sides 51 and 52 to receive a pin 57 which forms a stop for the weighted detent 54 and thus determines the cylinder-locking position of the detent, as best shown in Figure 2. The cylinder 38 may readily be attached to the bracket 41 by pressing the pin 43 downwardly into the notch 42, momentarily swinging the detent 54 upwardly so that the nose 56 moves downwardly and accommodates the passage of the pin 43 of the cylinder 38 into a seating position in the notch 42, whereupon the nose section 56 clears the pin and the detent 54 swings down into its locking position, as shown in Figure 2. The surface of the detent nose section 56 that engages the cylinder pin 43 is so shaped that it bears against the pin at such an angle that the detent resists any tendency for the pin to inadvertently move out of the notch 42, yet the cylinder may readily be removed from the bracket 41 merely by lifting the detent 54 so as to swing the nose section 56 downwardly and away from the pin, freeing the latter. Preferably, as best shown in Figure 2, the rearward edge of the nose section 56 is substantially arcuate about the axis of the pin 53 as a center whereby, substantially as soon as the pin 43 seats in the bottom of the notches 42, the arcuate nose section moves into a position in contact with but above the central or widest part of the cylinder pin 43, thus holding the latter in position without appreciable looseness, substantially as illustrated in Figure 1. The removal of the cylinder 38 from the mounting means supporting the same on the harrow drawbar is completed by removing the quick detachable pin 39 and thus disconnecting the piston rod from the upper end of the lever 31.

In order that operation of the cylinder 38 may be effective to shift the drawbar members 8 and 9 relative to each other, an anchoring link 60 is provided. Preferably, the anchoring link comprises a pair of rods 61, each pivoted, as at 63, to the bracket 41 or to an adjacent portion of the channel 9, and at its rear end each of the rods 61 is provided with a slot 64 through which a pin 65 carried by the side bars 32 and 33 of the lever 31 passes. A pair of hose lines 66, 67 lead from the cylinder 38 to a controlled source of fluid pressure on the tractor. The hydraulic unit 38 is of the double acting type and is arranged so that fluid under pressure may be directed through one of the hose lines into one side of the cylinder and the fluid at the other side of the cylinder is discharged back to the tractor through the other hose line. By operating the hydraulic controls the piston and cylinder unit may be extended or retracted by power, as desired.

Referring to Figure 1, if, for example, power is delivered to the hydraulic unit 38 to extend the same, the arm or lever 31 is caused to swing so that, reacting through the links 61 against the front end of the drawbar channel 9, the lower end of the arm or lever 31 shifts the drawbar member 8 forwardly relative to the forward drawbar member 9, this movement occurring until the front end of the member 8 engages the slide 18, which limits further collapsing or telescoping movement. This brings the disk gangs 1 into their straightened or transport position. In order to cause the disk gangs 1 to go into angle, all that it is necessary to do is to direct fluid under pressure into the rear end of the cylinder 38, thus causing the lever 31 to be swung in the other direction. Due to the slots 64, this movement of the cylinder 38 does not forcibly move the gangs into their angled position, but they do move into their angled position by virtue of soil pressure acting against the disks when the outfit is moved forwardly. The purpose of the slots 64 is to accommodate the ready attachment and detachment of the cylinder unit 38. This may be done readily since the pins 39 and 43 may be easily brought into position by a limited amount of manual movement of the arm 31, as permitted by the slots 64. If the slots 64 were not provided, it would be necessary to exercise extreme care in order to extend the cylinder 38 to exactly the right amount so as to bring the pin 39 opposite the openings in the lug 36 at the same time that the pin 43 is disposed in exactly the right position to enter the notch 42. However, the slots 64 permit a certain amount of free movement of the arm 31, and hence the attachment of the cylinder 38 is facilitated since all that it is necessary to do in attaching the cylinder 38 is to swing the lever 31 manually, after seating the pin 43 in the notch 42, until the opening in the lug 36 moves into a position registering with the openings in the yoke 49, whereupon the quick detachable pin 39 may readily be reconnected in place.

Figure 3 shows the parts when the cylinder unit 38 is entirely detached therefrom, and with a cable C connected to the outer end of the latch lever 25 for operating the latter by a pull exerted on the cable C. Figure 3 also shows the parts in the positions they may be in when reattaching the unit 38. From this figure it will be clear how the arm 31 may, by virtue of the slots 64, be swung manually into different positions in order to register the opening in the outer end of the arm 31 with the openings in the yoke 49 through which the pins 39 may extend. The fluid directed to the cylinder will then swing the arm 31 into a position with its lower end substantially up against the slide 18, as illustrated in Figure 1.

While I have shown and described above, the preferred structure in which the principles of the present invention have been incorporated, it is to be understood that my invention is not to be limited to the particular details shown and described above, but that, in fact, widely different means may be employed in the broader aspects of my invention.

What I claim, therefore, and desire to secure by Letters Patent is:

In a fastening apparatus, a part to be latched, means for receiving said part comprising a bracket having a U-shaped part-receiving notch, a detent pivoted to the upper end portion of one leg of said bracket above and to one side of the bottom of the notch and having a rounded nose section extending across said notch toward the other leg of said bracket and an outer weighted handle, the rounded nose section being on the side of the detent adjacent said part, and a stop carried by said bracket in a position to cooperate with the detent for limiting movement of the detent about its pivot in a direction carrying the rounded nose section generally laterally into a first position over said part so as to hold said part in the bottom of the notch, said rounded nose section being substantially arcuate about the pivot axis of said detent and the arcuate edge of said rounded nose section having a radius such that said edge lies generally contiguous to the adjacent portion of said part when the detent engages said stop, whereby, while the part remains in the bottom of the notch, said detent may be swung about its pivot in the opposite direction so as to carry the rounded nose section past the adjacent portion of said part and into a second position away from said part, said detent being formed at the portion above said rounded nose section so as to lie substantially flush with the laterally inner edge of said one leg of said bracket when said detent is swung to carry said nose section into said second position, thereby freeing said part.

References Cited in the file of this patent

UNITED STATES PATENTS

| Number | Name | Date |
|---|---|---|
| 193,678 | Unger | July 31, 1877 |
| 362,405 | Tompkins | May 3, 1887 |
| 466,672 | Galbreath | Jan. 5, 1892 |
| 933,511 | Weston | Sept. 7, 1909 |
| 1,491,219 | Wells | Apr. 22, 1924 |
| 1,789,765 | McKinney | Jan. 20, 1931 |
| 1,846,465 | Becker | Feb. 23, 1932 |
| 2,126,026 | Munson | Aug. 9, 1938 |
| 2,332,561 | Drott | Oct. 26, 1943 |
| 2,486,372 | Rockwell | Oct. 25, 1949 |